Oct. 16, 1956  L. J. LAULER ET AL  2,766,981
WEIGHING SCALE SYSTEM
Filed Nov. 30, 1951  3 Sheets-Sheet 1

INVENTORS.
LOUIS J. LAULER
MATTHEW T. THORSSON
ATTORNEY

Oct. 16, 1956     L. J. LAULER ET AL     2,766,981
WEIGHING SCALE SYSTEM

Filed Nov. 30, 1951     3 Sheets-Sheet 2

INVENTORS.
LOUIS J. LAULER
MATTHEW T. THORSSON
BY
ATTORNEY

INVENTORS.
LOUIS J. LAULER
MATTHEW T. THORSSON
BY Paul L. Kirsher
ATTORNEY

United States Patent Office 2,766,981
Patented Oct. 16, 1956

2,766,981

WEIGHING SCALE SYSTEM

Louis Joseph Lauler and Matthew T. Thorsson, Rock Island, Ill., assignors to Fairbanks, Morse & Co., Chicago, Ill., a corporation of Illinois Application November 30, 1951, Serial No. 259,148

5 Claims. (Cl. 265—70)

This invention relates to weighing scales, and more particularly to a weighing scale organization embodying an electrical system for sensing scale loading and effecting weight indication of scale loads.

In general, the weighing scale organization of the present invention includes load support means which for example, may be a scale platform and lever system of any well known type, and strain gage load cell means coupled to the load support means for sensing the loading of the support. The load cell means herein employed is of known construction, providing an electrical network normally balanced under zero strain condition of the cell means, and producing an output voltage the magnitude and phase direction of which are directly dependent upon the extent and direction of unbalance of the network as determined in the load sensing function of the cell means, by the application of load to and load removal from the scale load support means. The load cell means which in load sensing unbalance of its network produces an output voltage proportional to the weight of the scale loading, is included in the electrical system of the present invention, to function as the activating agency in such system. The electrical system referred to, embodies in addition to the cell means, a tare bridge network, a balance bridge network including a balancing potentiometer, a novel control provision for the balance bridge network, a phase sensitive amplifier, and a reversible motor in operative connection to the balancing potentiometer and to weight indicator means.

In the scale organization generally outlined above, the cell means normally is subjected to an initial strain due to the tare or "dead" weight of the load support means, which results in a cell network output voltage proportional thereto. Such cell voltage alone or as increased in magnitude due to load tare weight imposed on the load support, is nullified through the tare bridge network which is made adjustable for that purpose, so that this initial cell voltage will not interfere with the normal weight sensing and indicating function of the system in respect to all loads to be measured. Once the tare bridge adjustment is made, application of load to the support means will unbalance the cell network to activate the electrical system, the net cell output voltage (in the range above the initial cell voltage cancelled out by the tare bridge network) then being applied to the balance bridge network and causing through the amplifier means, operation of the motor in the proper direction such that it actuates the balancing potentiometer in the direction to produce an opposing voltage in the balance bridge network and balance out the net cell output voltage, whereupon the motor stops. Any decrease in the load under measurement or its removal from the support, will effect corresponding decrease in the net cell output voltage with resultant unbalance of voltages in the balance bridge network in the opposite direction, and consequent reverse operation of the motor to actuate the potentiometer in the opposite direction until the balance bridge once again provides an opposing voltage equal to the new net cell output voltage. In all cases the extent of motor operation in either direction, is a definite function of the magnitude of the net cell output voltage, while the net cell voltage is directly proportional to the weight of the load to be measured. Therefore, the extent of motor operation is proportional to the weight of the load to be measured, so that in the present system the motor is utilized to operate in addition to the bridge balancing potentiometer, a suitable weight indicator such as a weight reading dial or the like.

Through regulation of the balancing characteristics of the balance bridge network, the extent of motor operation may be related to the weight of the scale load to be measured, by a definite ratio predetermined such that the motor in operating the weight indicator through reduction gear means selected in accordance with said ratio, will cause an indicator reading of the scale load weight in terms of pounds, for example. Regulation of the balance bridge network for the foregoing purpose, is accomplished through the bridge control provision hereinbefore mentioned. The control provision, the specific character and function of which will appear from the following description of exemplary embodiments of the invention, is adapted for selectively conditioning the balance bridge network to determine the extent of motor operation required for rebalance of the bridge through the potentiometer, such that in one selected conditioning of the bridge network, motor operation of the weight indicator will establish weight readings of scale loads in terms of, for example, avoirdupois units, as pounds, and in another selected conditioning of the bridge network, motor operation of the weight indicator will establish weight readings of scale loads in terms of equivalent units in another pre-selected weight measuring system, as kilograms in the metric system, while in other selected conditions of the network, weight readings may be obtained in units of still other measuring systems.

The present electrical system embodies in addition, an energization control provision for the reversible motor, which is operable selectively to condition the motor for operation in response to load cell sensing of scale loads, or to prevent motor operation. By this provision the motor when operated to set-up a weight indication on the indicator means, may be held in its operative position irrespective of any subsequent change in scale loading. This permits the indication of a given weight, holding of the weight indication while another weight is applied to the weighing mechanism, and thence reconditioning the motor for operation to indicate the new weight without requiring return of the motor to its initial position representative of zero scale load. This materially reduces the time element in effecting weight indications where a group of relatively or nearly similar weights are to be measured.

The present invention includes further, a tare bridge network arrangement embodying separate bridge adjustment means, one provided for effecting tare bridge adjustment at zero scale loading, to balance out the load cell voltage produced consequent to cell stress due to the tare or "dead" weight of the load support or scale mechanism alone. The other adjustment means is adapted for ready operator control to enable balancing of the bridge against cell voltages due to load tare weights, or to condition the tare network for this purpose in instances where the weight of the tare load, as the weight of an empty container or the like, is known prior to scale application of such load. In connection with the latter control is a weight indicator device settable by operation of the bridge adjustment provision thereof, to indicate the load tare weights corresponding to bridge control positions of the adjustment means.

The foregoing and other features of the present invention, together with the several objects and advantages thereof, will appear more fully upon consideration of the following description of the invention as shown by the accompanying drawings, wherein.

Figure 1:
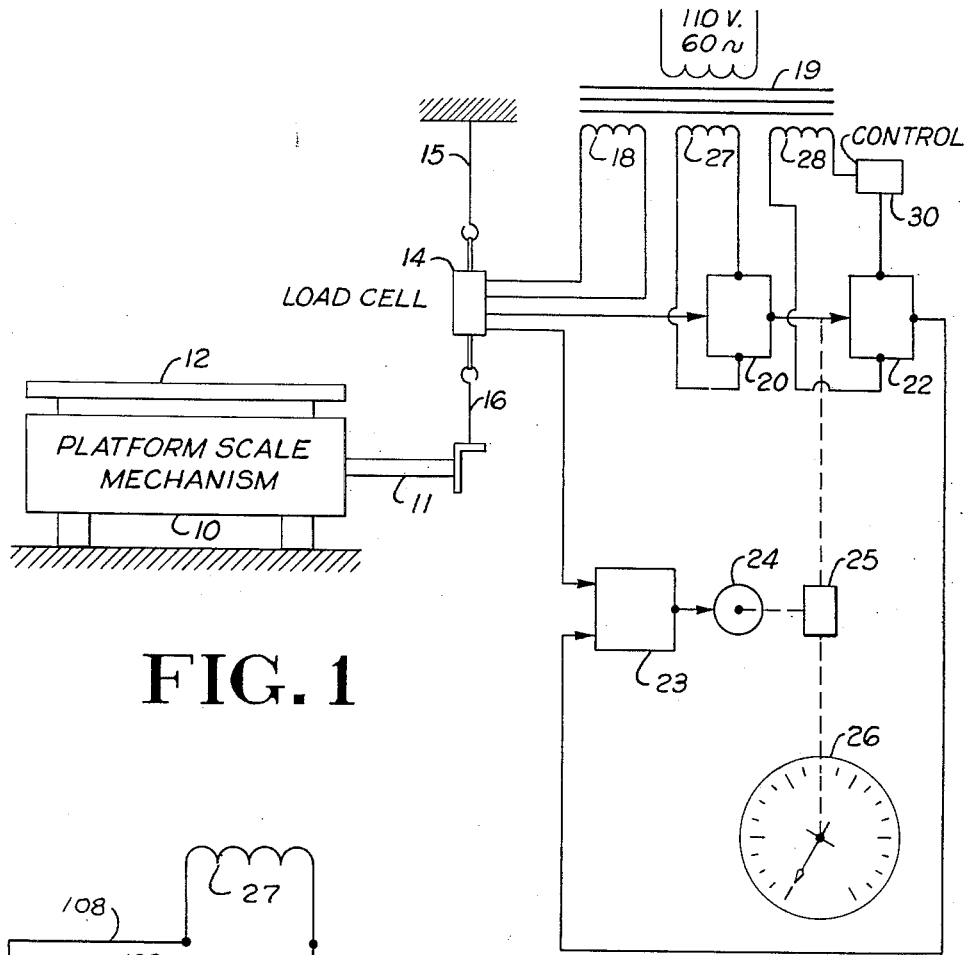
Fig. 1 illustrates diagrammatically, a platform scale mechanism and electrical apparatus in operative association therewith for sensing scale loading and producing weight indications of scale loads.

Referring to the drawings and first to Fig. 1 thereof, the present electrical system for sensing and producing weight indications of scale loads, is shown by way of example, in operative association with a load support or platform scale mechanism generally indicated at 10. Such mechanism may be of usual or well known platform and lever construction providing an output lever 11 movable in response to loading and unloading of the scale platform 12. In place of the usual mechanical balance beam provision operated from the output lever 11 as through a steelyard connection, is a single strain gauge load cell device 14. The load cell 14 is of known construction, and is supported from a fixed support 15 and coupled to the scale output lever 11 as at 16, so that its strain responsive element is thereby directly subject to displacement of the lever 11 consequent to loading and unloading of the scale platform 12. As is known, the load cell 14 embodies an electrical network having an input circuit supplied from a constant voltage source such as the secondary winding 18 of an alternating current supply transformer 19, and an output circuit providing an output potential the magnitude and phase direction of which are dependent upon the extent and direction of unbalance of the cell network consequent to cell reaction to the loading and unloading of the scale mechanism. Although an alternating current source of input to the cell network is here shown in the preferred example of the invention, where it is desired a suitable source of direct current voltage may be employed to supply the cell network input.

The cell output voltage is transferred through the output side of a tare bridge network 20, the output side of a balance bridge network 22, and a suitable phase sensitive electronic amplifier 23, to the control field portion (see Fig. 2) of a reversible motor 24. Motor 24 serves to operate as through suitable reduction gearing 25, a network rebalancing device embodied in the balance bridge 22, and also a weight indicator device such as a dial indicator 26. The input circuit of tare bridge 20 is supplied from a fixed source, as the transformer secondary winding 27, while the input of balance bridge 22 is supplied from secondary winding 28 of transformer 19 through an electrical control 30 of a nature and serving a purpose to appear. The weight sensing and weight indicating function of the electrical system, together with the purpose and function of the tare and balance bridge networks and bridge control 30, will appear from the following description of the electrical circuit portion of the system shown in greater detail by Figure 2.

Figure 2:
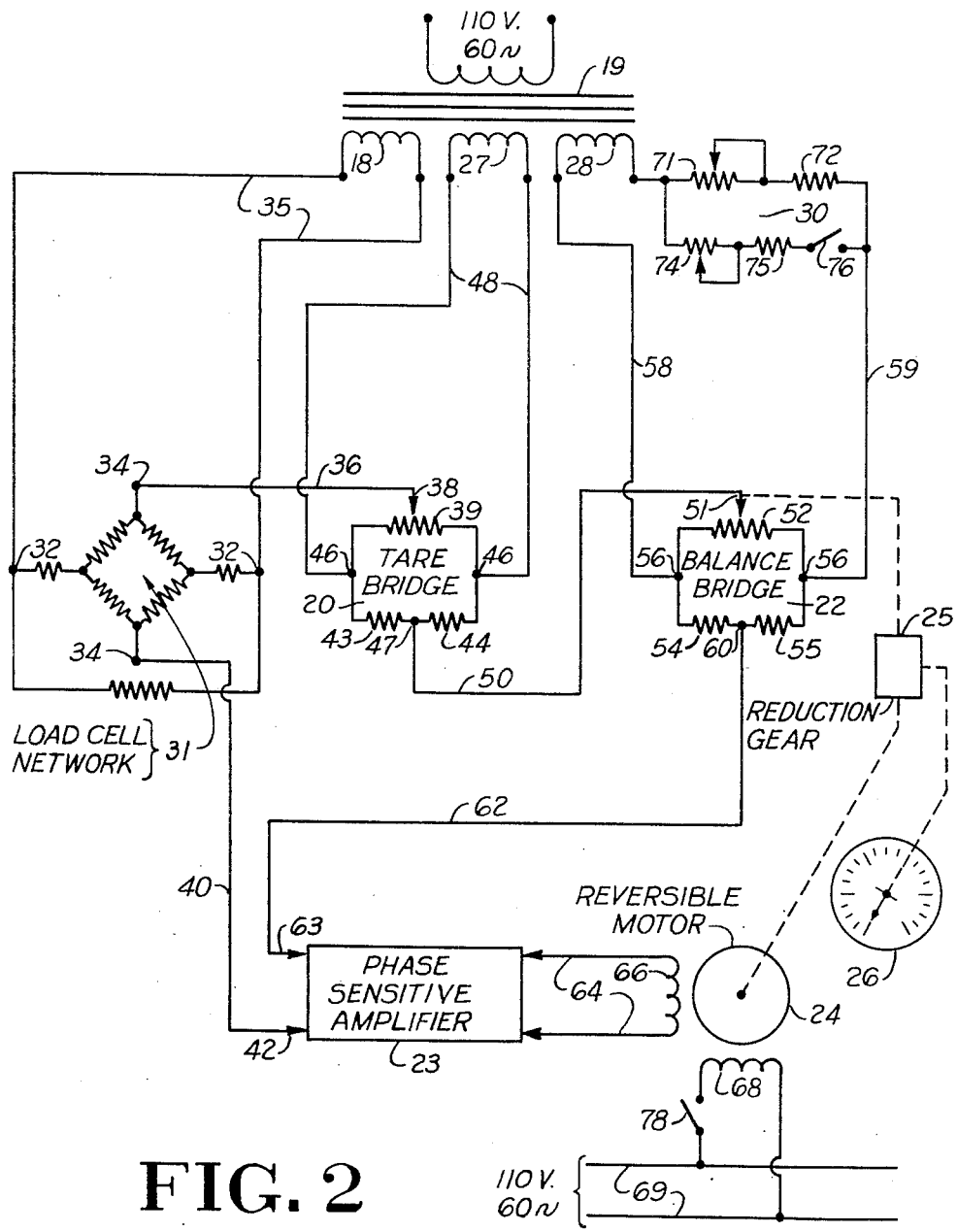
Fig. 2 is a diagram of the electrical circuit arrangement for the electrical apparatus shown in Fig. 1.

Referring to Fig. 2, the electrical network of the strain gauge load cell 14 is shown in the form of a Wheatstone bridge generally indicated by the numeral 31, having input terminals 32 and output terminals 34. The bridge input terminals 32 are connected through an input circuit 35 to the voltage source provided by the secondary winding 18 of the supply transformer 19, supplying a predetermined fixed voltage at the network input terminals. It may be noted here that the load cell 14 is selected such that its load responsive capacity corresponds to the load capacity of the associated platform scale mechanism 10 illustrated in Fig. 1.

One output terminal 34 of the cell network is connected by a lead 36 to the movable element 38 of a variable resistance device or potentiometer 39 providing two legs of the tare bridge network 20, while the opposite output terminal 34 of the cell network is connected by lead 40 to one input terminal 42 of a suitable phase sensitive electronic amplifier 23.

The remaining or complimentary legs of the tare bridge 20 are provided by fixed resistance elements 43 and 44, the bridge providing input terminals 46, a fixed output terminal 47 and opposite output terminal which is here constituted by the movable element 38 of the bridge potentiometer 39. The input terminals are connected through a circuit 48 with a bridge input source provided by the transformer secondary winding 27 affording a predetermined constant voltage presently to be referred to. A circuit lead 50 connects the fixed output terminal 47 of the tare bridge to the movable element 51 of a potentiometer 52. The potentiometer 52 provides two legs of balance bridge network 22, the opposite two legs of which are found in fixed resistance elements 54 and 55. The bridge input terminals 56 are supplied through conductors 58 and 59, with an input voltage derived from the transformer secondary winding 28. It is to be noted that the conductor 59 includes resistance means forming the control 30 as indicated in Fig. 1, the nature and function of which will be more fully described hereinafter. The fixed output terminal 60 of the balance bridge is connected by circuit lead 62 with the remaining input terminal 63 of the amplifier 23. The output of the amplifier is connected by the circuit 64 to the control field winding 66 of the reversible motor 24. The motor 24 which may be of a well-known two-phase type, includes a main field winding 68 energized from a suitable fixed voltage source, as the 110 volt, 60 cycle line 69. Motor 24 serves through reduction gear mechanism diagrammatically indicated at 25, to operate the movable element 51 of the balance bridge potentiometer 52, and at the same time to operate a weight indicator 26 which is here shown to be of a dial type.

As is known in connection with strain gauge cells of the character now indicated, the cell network output is at zero voltage under the condition of zero strain of the cell. In the present application of the load cell to a load suport such as the indicated platform mechanism (Fig. 1), the cell is under an initial strain due to the tare or "dead" weight of the scale platform and associated lever mechanism including the output lever 11. In a system of the character under consideration, it is desirable to eliminate such initial output voltage from any effect upon the electrical system in its load weight indicating function. This may be done by electrically counterbalancing or balancing out such voltage through the tare bridge network 20. To that end, the balancing characteristics of the tare bridge and the bridge input voltage from the transformer secondary winding 27 are predetermined with respect to the initial cell output voltage, or such voltage as it may be increased by tare weights imposed on the scale platform, so that upon adjustment of the tare bridge potentiometer 39, the initial voltage will be effectively counterbalanced or cancelled. Consequently, the cell voltage effective in the system beyond the tare bridge, will be that portion of the cell output voltage which is directly representative of the loads to be measured, and this voltage will be referred to hereinafter as the error voltage in the system.

In the absence of a load to be measured on the scale platform 12, the net output or error voltage of the load cell will be zero since the initial cell voltage due to the tare or "dead" weight of the scale mechanism and any load tare weight on the platform, is cancelled out through the tare bridge 20. Under this condition, the motor 24 is set to position the movable element 51 of the balance bridge potentiometer 52 such that the bridge is in balance with zero voltage across its output terminals 51 and 60, and hence zero voltage at the input terminals 42 and 63 of the amplifier 23. Now upon application of a load to be measured by the scale mechanism, the load cell network will develop an error voltage in one phase direction and of a magnitude which is proportional to the weight of the imposed load. This error voltage is delivered to the amplifier 23 through the tare bridge and the balance bridge 22. The net or error voltage then amplified by the amplifier 23 and imposed upon the motor control winding 66, causes motor operation (assuming the motor main winding 68 to be energized) in one direction such as to move the element 51 of the potentiometer 52 in the direction to effect and unbalance of the balance bridge 22. When bridge 22 provides an opposing voltage equal to the net cell output voltage, the motor 24 stops because of the absence of input voltage to the amplifier at such time, with consequent zero voltage at the motor control field 66. When the load on the scale platform is removed in part or entirely, the net cell output or error voltage is reduced proportionately. The opposing voltage provided by balance bridge 22 and the net cell output voltage becomes correspondingly unbalanced but in the opposite direction, so that motor 24 in response to the changed cell voltage, operates the movable element 51 of the balance potentiometer 52 in the opposite direction to decrease the opposing voltage provided by bridge 22 until the opposing voltage and net cell output voltage are balanced, at which time the motor again stops.

From the foregoing, it will appear now that in all cases the extent of operation of the reversible motor 24, as well as the position of the potentiometer element 51 relative to its initial bridge balancing position under no load on the scale platform, is proportional to and hence representative of the weight of the scale load to be measured. Therefore, motor 24 may be utilized to operate a suitable weight indicating device such as the scale indicator 26.

An important feature of the present invention resides in the control instrumentality 30 associated with the balance bridge 22. It will be appreciated that by properly adjusting the balancing characteristic and range of the balance bridge 22 in view of the load range capacity of the platform scale mechanism with which the present electrical system is utilized, the present system may be adjusted or calibrated for providing indications of the weight of the loads to be measured in terms of, for example, avoirdupois units, as pounds, or in units of any other measuring system, as the pound equivalent kilograms of the metric system. For this purpose then, the control 30 as shown in Fig. 2, is a resistor type control for regulating the potential value of the voltage at the input terminals of the balancing bridge network 22. It provides a first resistance circuit comprised of an adjustable resistance 71 and a fixed resistance 72 in series in the supply conductor 59, the adjustable resistance 71 being selected to afford close or fine adjustments of the total resistance of the circuit. By utilizing a resistance 72 having a predetermined resistance value, and adjusting the total resistance of the circuit through adjustment of resistance 71, the voltage at the bridge input terminals may be thereby determined and fixed at a potential value required for calibrating the balance bridge network 22 so that it will be effective over substantially the entire range of the balancing potentiometer 52, to determine at any scale loading within the maximum load range of the scale system, the extent of operation of motor 24 required to move potentiometer element 51 sufficiently to produce zero error signal, such that the relation between the scale load weight in terms of say, pounds, and the number of revolutions or fractional part of a revolution of the motor rotor element is in accordance with a definite desired ratio. The ratio thus determined may be for example, 10:1, so that each ten revolutions of the motor rotor element represents one pound of scale load weight. Consequently, through proper selection of the gear ratio in the reduction gear unit 25, motor operation of the weight indicator 26 will set-up on the latter, weight indications in pounds.

Selectively connectible in parallel circuit with the resistance elements 71 and 72 are series connected resistance elements embodied in an adjustable resistance 74 and a fixed resistance 75, the circuit including a switch 76 for connecting or disconnecting the parallel circuit. Closure of switch 76 introduces the resistance elements 74 and 75 in parallel with the similar elements 71 and 72, which thereby alters the balancing characteristic of the balance bridge 22 through resultant change in the input voltage effective at the bridge input terminals. Through employment of a resistance element 75 having a predetermined resistance value, and adjustment of the total resistance of the parallel circuit by adjusting the resistance 74, the total effective resistance of the two circuits in parallel may be thereby set to determine the voltage across the input terminals of the balance bridge network 22, at a potential value which bears a definite ratio relationship to the potential value of the bridge input voltage as determined solely by the first resistance circuit comprising the resistance 71 and 72. Consequently, upon closure of switch 76 to introduce the parallel circuit of resistance 74 and 75, the balancing characteristic of the balance bridge 22 becomes modified in accordance with the ratio of the bridge input voltages above indicated, so that the bridge determined extent of operation of motor 24 necessary to move the element 51 of bridge balancing potentiometer 52 to produce a predetermined voltage in opposition to a load cell voltage, is thereby altered in exact accordance with the voltage ratio. In this way motor operation of the indicator 26 may be changed to afford indication of scale load weights in units of another measuring system. For example, assume that the first resistance circuit of resistance elements 71 and 72 is selected to determine the bridge input voltage at a value which conditions the bridge for controlling the operation of motor 24 such that it actuates the indicator 26 to indicate scale load weight in pounds. Now, by utilizing a resistance element 75 of a predetermined resistance value, the adjusted total resistance of the parallel circuit containing resistances 74 and 75, may be made effective with the adjusted total resistance of the first circuit of resistance 71 and 72, to determine the voltage across the bridge input terminals at a potential value relative to that of the voltage determined by the first resistance circuit alone, which is in the ratio of 2.204:1. Since this ratio is the multiplying ratio for conversion of pounds to kilograms, the system may be thus conditioned for motor operation of the indicator 26 to indicate the scale load weight in terms of pound equivalent kilograms of the metric system. Opening of the switch 76 to remove the parallel circuit, then will return the balance bridge characteristic to a determination of weight readings in terms of pounds.

Included in the supply circuit to the main field 68 of motor 24 is a control switch 78 which when closed, conditions the motor 24 for operation in response to load responsive energization of its control field winding 66. The switch 78 in open position, prevents motor operation. This provision which is in the nature of a motor holding control, permits motor retention of a weight reading on the indicator 26 while the indicated load is removed from the scale platform and another load placed thereon. The succeeding load will result in a corresponding amplified error voltage at the motor control winding 66, so that upon closure of switch 78, the motor 24 will operate forwardly or reversely depending upon the phase of the voltage at winding 66, such as to relocate the indicator pointer in a position corresponding to the weight of the new load. Such weight indication is effected quickly and in a much shorter time than would be required were the motor returned to its initial zero load position in response to removal of the load from the scale, followed by actuation to set-up the indicator weight in accordance with the succeeding load application. This feature is of particular advantage in instances where a number of nearly similar loads are to be measured. It serves in addition, to reduce operational wear in respect to the motor, the balancing bridge potentiometer and other operating elements of the system, as the hold provision avoids the necessity for full operation of these parts during individual weighing of a plurality of nearly similar loads.

While the control provision 30 of the system according to Fig. 2, affords weight indications selectively in units of either of two different weight measuring systems, as pounds and kilograms of the avoirdupois and metric systems respectively, the control may be modified to provide for weight indications in terms of any selected one of a plurality of different weight measuring systems. The control may be adapted also, to afford fluid measure indications, as gallons, litres and the like, in instances of weighing fluid material subject to a definite conversion ratio of weight to fluid measure. Such a modified control is illustrated at 30' in Fig. 3, in the circuit arrangement there shown which is essentially a repetition of the circuit of Fig. 2. Since the only difference, then, resides in the control 30', the several circuit elements of Fig. 3 which are the same as or correspond to the like elements of the circuit of Fig. 2, are here given the same reference characters.

Figure 3:
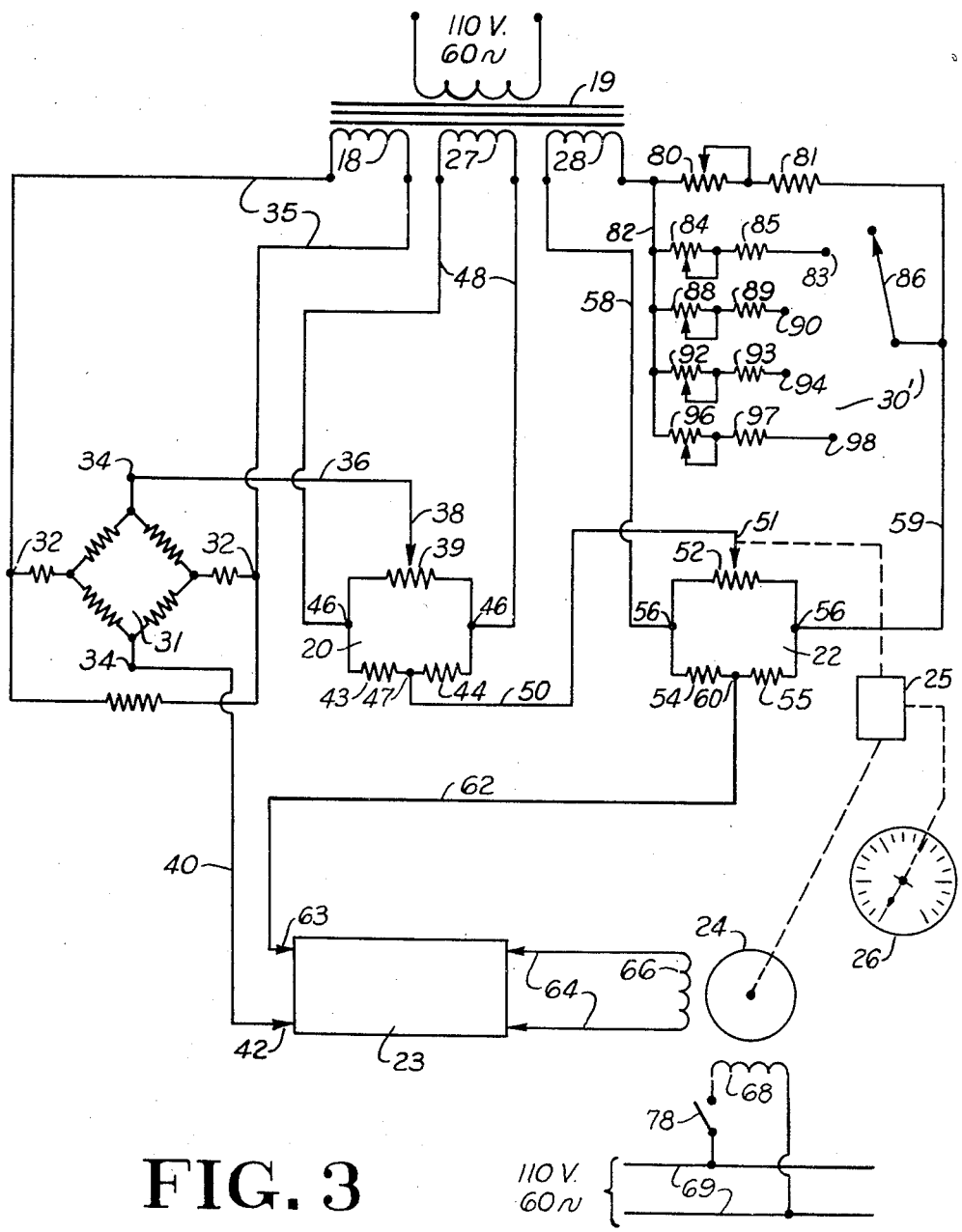
Fig. 3 is a circuit diagram like that of Fig. 2, but illustrating a modification in respect to the balance bridge control provision of the circuit of Fig. 2.

Referring to Fig. 3, the modified control 30' includes serially connected adjustable resistance 80 and fixed resistance 81 in the voltage supply lead 59 to the input terminal 56 of the balance bridge 22. These resistance elements may correspond to the elements 71 and 72 of Fig. 2, as to provide for scale load readings in pounds, for example. Extending from the lead 59 at a point thereof between the resistance 80 and transformer secondary coil 28, is a conductor 82. Between conductor 82 and a switch contact 83 is a first parallel circuit comprising serially connected adjustable resistance 84 and fixed resistance 85, this circuit being connectible in parallel with the resistances 80 and 81 through engagement of the movable switch member 86 with contact 83. In the present example, resistances 84 and 85 may correspond to the resistances 74 and 75 of the control according to Fig. 2, so as to provide for weight readings in say, kilograms.

A second parallel circuit comprises adjustable resistance 88 and fixed resistance 89 in series connection between the conductor 82 and a second switch contact 90, this circuit being connectible in parallel with the series resistances 80 and 81 by engagement of the switch member 86 with contact 90. Through proper selection of the resistance 89 as to its resistance value, and adjustment of the total resistance of the second parallel circuit, this circuit may be thus conditioned for parallel circuit cooperation with the circuit of resistances 80 and 81, to determine the input voltage to the balance bridge 22 at a value in direct ratio to the value of the voltage determined by the first resistance circuit of elements 80 and 81, when the latter circuit is effective in the open-circuit condition of the switch 86 relative to any of the several parallel circuits. The ratio effective here, may be that corresponding to the conversion factor applying in converting the weight units, as pounds, set up by the system as conditioned therefor by the first resistance circuit of elements 80 and 81 when in effect to the exclusion of the parallel circuits, to equivalent weight units in another weight measuring system, as for example, libras in the Spanish weight system.

Similarly, a third parallel circuit comprised of series connected adjustable resistance 92 and fixed resistance 93, is connected between the conductor 82 and a third switch contact 94, while a fourth parallel circuit comprised of series connected adjustable resistance 96 and fixed resistance 97, is connected between the conductor 82 and a fourth switch contact 98, and one or more additional parallel circuits may be added if desired. In the third parallel circuit, the fixed resistance 93 is selected as to its resistance value so that the adjusted total resistance of the parallel circuit in cooperation with the adjusted total resistance of the first circuit of elements 80 and 81, results in an input voltage across the bridge input terminals which is in a predetermined direct ratio with the input voltage as determined by the first circuit alone. Such ratio may be that corresponding to the conversion factor applicable in converting say pounds to equivalent weight units in a measuring system other than those hereinbefore mentioned. Likewise, the resistance 97 of the fourth parallel circuit is provided to have a resistance value effective in like manner, to determine the bridge input voltage in direct ratio with that determined by the first circuit alone, such that the ratio corresponds to the conversion factor determined for converting pounds to equivalent units in still another measuring system.

It is to be noted here that any one or more of the parallel circuits may be conditioned to afford an indication of scale loads in terms of weight equivalent fluid measure, as gallons for example. Where fluid material to be weighed is subject to a definite weight to fluid measure equivalency, such as five pounds per gallon, one of the parallel circuits may have its fixed resistance of a resistance value to result in a change in the bridge input voltage in predetermined direct ratio with the input voltage determined by the first circuit alone, wherein such ratio is that corresponding to the weight to fluid measure conversion factor applicable to the given fluid material. Thus, the present control provision as so modified, will provide a selective indication of the scale load (fluid material) in terms of its weight or in terms of fluid measure.

Figure 4:
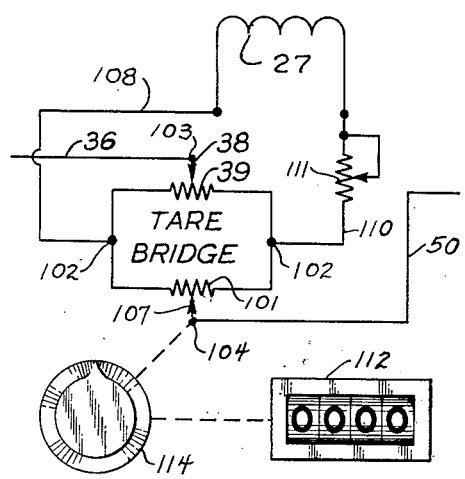
Fig. 4 illustrates a modified tare bridge network suitable for application to the system of Figs. 2 and 3, for providing indications of tare loads.

Fig. 4 illustrates a modified tare bridge network and control arrangement which may be substituted for the tare bridge network 20 shown in the system according to either Fig. 2 or Fig. 3. The tare bridge as here illustrated, includes a potentiometer resistance 39 affording two legs of the bridge, a potentiometer resistance device 101 providing the other legs of the bridge network, bridge input terminals 102 and bridge output terminals 103 and 104. Output terminal 103 is associated with the variable contactor 38 of potentiometer 39 and is connected with the load cell output (Fig. 2) by the conductor 36. The output terminal 104 which is associated with the variable contactor 107 of potentiometer 101, is connected by lead 50 to the balance bridge network 22 as shown in Fig. 2 for example.

The tare bridge input is supplied as from the transformer secondary winding 27 of the transformer 19 shown in Fig. 2, over circuit leads 108 and 110 connected to the bridge input terminals 102. Included in the lead 110 is a bridge calibrating control in the form of an adjustable resistance 111, which serves to permit adjustments in the potential valve of the voltage across the input terminals 102, as for the purpose now to be described.

Assume for present example, that the relation of load cell output voltage to scale load weights in pounds is one millivolt for each 900 pounds, and that the tare load balancing capacity of the tare bridge is to be about 900 pounds. Given these factors, the bridge potentiometers 39 and 101 are so selected as to their resistance capacities, while the input voltage at the bridge terminals 102 is so adjusted as to its potential value through adjustment of the resistance 111, that the tare bridge network is thereby conditioned for electrically counter-balancing or balancing out the load cell voltage incident to the "dead" load weight of the scale mechanism, together with additional load cell voltages up to one millivolt at maximum tare load. In the bridge arrangement shown, the variable contactor 107 of potentiometer 101 is set in an initial position, as at one end of the resistance control span, whereupon the contactor 38 of potentiometer 39 is moved to a control position effectively balancing out the cell voltage due to the "dead" weight of the scale mechanism, so that the tare bridge output terminal 104 then will be at zero potential. Thereafter cell voltages produced by load tare weights up to 900 pounds, may be balanced out by shifting the contactor 107 of potentiometer 101 from its initial position toward the end of the potentiometer control span effective for this purpose, until the bridge output terminal 104 is at zero potential as indicated by zero weight reading of the indicator 26 (Fig. 2). Cell voltages above that balanced out by the tare bridge and due to scale loads to be measured, then will be transferred through the tare bridge to the balance bridge network 22 (Fig. 2) for causing operation of the system as hereinbefore described.

In the tare bridge example above given, the one millicell voltage produced by the maximum tare weight of 900 pounds, requires full displacement of the potentiometer contactor 107, as to the end of the effective span of the potentiometer, in order to balance out this voltage. Accordingly, it will appear that the extent of displacement of the contactor 107 relative to its initial position, will be exactly proportional to the tare weight in pounds. Therefore, the extent of contactor displacement may be translated to tare weight indication on a suitable indicator 112 which for example, may be a counter device such as a Veeder-Root counter. Such translation may be effected most conveniently, through the operator-manipulated means here indicated diagrammatically as a rotary control 114, suitably connected to the contactor 107 for effecting control positions of the latter, and connected also to the counter 112 for actuation thereof to set up tare weight readings corresponding to control positions of the contactor. Thus through the indicated control means 114, the counter may be related to the contactor 107 such that positioning of the latter to balance out the cell voltage due to a tare weight of say 500 pounds, will set up a tare weight reading of 500 pounds on the counter.

The modified tare bridge arrangement as now described, offers a very important advantage in weighing operations where the weight of the tare load is already known, as in the instance of a material container the weight of which has been previously determined and hence known to the operator or weighman. In this case, and particularly, where the same container is employed in successive weighing operations, or a number of containers all of the same weight are to be employed one after the other in load weighing, the operator need only adjust the tare bridge through the control 114, to care for the known tare weight. Such adjustment sets up at the same time, the tare weight on the indicator 112. Whereupon, the weighing operations may proceed without further attention to the tare bridge control, the indicator 26 of the scale system then indicating the weights of the loads to be measured as the load-filled containers are applied successively to the scale load support. It will be apparent, then, in weighing operations of this kind or in any case where the tare load is first determined, as by weighing of an empty container, that the present scale system when embodying the tare control of Fig. 4, will provide through the counter 112, tare weight readings in pounds, and through the indicator 26, indications of the loads to be measured in terms of load weight in pounds or in pound-equivalent units of any one of several different measuring systems.

It will be appreciated now that the present electrical system for sensing scale loading and causing weight indications thereof, is readily applicable to weight indication at points remote from the scale platform mechanism. Moreover, with the present system employing but a single load cell device, the latter may be coupled to the scale mechanism in a location such that the scale platform will be left wholly unobstructed. This is of particular advantage in those instances where bulky or elongate loads are to be measured. It will be appreciated also, that by proper selection of the control resistance in the control circuit 30 of Fig. 2 or the control circuit 30' of Fig. 3, the present system may be adapted for providing weight readings in units of one measuring system or in corresponding units of another or other desired measuring systems, with conversion from one to another effected simply and quickly, merely by the actuation of a suitable control switch.

Having now described and illustrated presently preferred embodiments of the invention, what we desire to claim and secure by Letters Patent is:

1. A weighing scale system comprising in combination, load support means, load cell means responsive to load conditions of said support means and embodying electrical circuit means producing an output voltage the magnitude of which is in direct proportion to the weight of the load on said support means, a voltage producing circuit connected in series circuit with said load cell circuit means for generating a voltage opposing said load cell output voltage, a first circuit means connected to a first power source and being in series circuit relation with said load cell circuit means and said opposing voltage circuit such that an error voltage signal produced therein is representative of the difference between said voltages, an indicator means, an electric motor operable to drive said indicator means and to effect operation of said opposing voltage producing circuit so as to reduce said error voltage signal to zero, said electric motor having a power winding and a control winding, a second circuit means connecting a second source of power to said power winding, said first circuit means being further connected to said control winding and serving to translate said error voltage to said motor and operate said motor to drive said indicator and said opposing voltage circuit, and means operable selectively for causing stoppage of said motor, said means including a switch connected in said second circuit means for disconnecting said second source of power from said power winding, thereby keeping said error voltage at all times present in said control winding of the first circuit which is maintained energized by said first power source.

2. A weighing scale system comprising in combination, load support means, load cell means responsive to load conditions of said support means and embodying electrical circuit means producing an output voltage the magnitude of which is in direct proportion to the weight of the load on said support means, a voltage producing circuit connected in series circuit with said load cell circuit means for generating a voltage opposing said load cell output voltage, said opposing voltage circuit including control means operable to selectively condition said opposing voltage circuit to produce an opposing voltage the magnitude of which is altered for each selected condition and is related in different selected conditions in proportion to the equivalent units of different system of weight measurement, a first circuit means connected to a first power source and being in series circuit relation with said load cell circuit means and said opposing voltage circuit such that an error voltage signal produced therein is representative of the difference between said voltages, an indicator means, an electric motor operable to drive said indicator means and to effect operation of said opposing voltage producing circuit so as to reduce said error voltage signal to zero, said electric motor having a power winding and a control winding, said first circuit means being further connected to said control winding and serving to translate said error voltage to said motor and operate said motor to drive said indicator and said opposing voltage circuit, a second circuit means connecting a second source of power to said power winding, and means operable selectively for causing stoppage of said motor, said means including a switch connected in said second circuit means for disconnecting said second source of power from said power winding, thereby keeping said error voltage at all times present in said control winding of the first circuit which is maintained energized by said first power source.

3. A weighing scale system comprising in combination, load support means, load cell means responsive to load conditions of said support means and embodying electrical circuit means producing an output voltage the magnitude of which is in direct proportion to the weight of the load on said support means, a voltage producing circuit connected in series circuit with said load cell circuit means for generating a voltage opposing said load cell output voltage, an amplifier connected to a first power source and having an input circuit and an output circuit, said load cell circuit means and said voltage producing circuit also being connected to said first power source, said input circuit being connected in series circuit relation with said load cell circuit means and said opposing voltage circuit such that an error voltage signal produced therein is representative of the difference between said voltages, said amplifier output circuit translating therein an amplified error voltage signal, an indicator means, an electric motor operable to drive said indicator means and to effect operation of said opposing voltage producing circuit so as to reduce said error voltage signal to zero, said electric motor having a power winding and a control winding, a first circuit means connecting said amplifier output circuit and said control winding, said first circuit means serving to translate said amplified error voltage to said motor and operate said motor to drive said indicator and said opposing voltage circuit, a second circuit means connecting a second source of power to said power winding, and means operable selectively for causing stoppage of said motor, said means including a switch connected in said second circuit means for disconnecting said second source of power from said power winding, thereby keeping said amplified error voltage at all times present in said control winding of the first circuit means which is maintained energized by the first power source.

4. A weighing scale system comprising in combination, a mechanical scale mechanism including an output lever, a load cell connected between a support and said lever and embodying an electrical network producing an output voltage the magnitude of which is in direct proportion to the weight of the load on said support means, a voltage producing circuit connected in series circuit with said load cell network for generating a voltage opposing said load cell output voltage, a first circuit means connected to a first power source and being in series circuit relation with said load cell network means and said opposing voltage circuit such that an error voltage signal produced therein is representative of the difference between said voltages, an indicator means, an electric motor operable to drive said indicator means and to effect operation of said opposing voltage producing circuit so as to reduce said error voltage signal to zero, said electric motor having a power winding and a control winding, said first circuit means being further connected to said control winding and serving to translate said error voltage to said motor and operate said motor to drive said indicator and said opposing voltage circuit, a second circuit means connecting a second source of power to said power winding, and means operable selectively for causing stoppage of said motor, said means including a switch connected in said second circuit means for disconnecting said second source of power from said power winding, thereby keeping said error voltage at all times present in said control winding of the first circuit which is maintained energized by said first power source.

5. A weighing scale system comprising in combination, a mechanical scale mechanism including an output lever, a load cell connected between a support and said lever and embodying an electrical network producing an output voltage the magnitude of which is in direct proportion to the weight of the load on said support means, a voltage producing circuit connected in series with said load cell network for generating a voltage opposing said load cell voltage, said opposing voltage producing circuit including control means operable to selectively condition said opposing voltage circuit to produce an opposing voltage the magnitude of which is altered for each selected condition and is related in different selected conditions in proportion to the equivalent units of different systems of weight measurement, an amplifier connected to a first power source and having an input and an output circuit, said load cell network and said voltage producing network also being connected to said first power source, said input circuit being connected in series circuit relation with said load cell network and said opposing voltage circuit such that an error voltage signal produced therein is representative of the difference between said voltages, said amplifier output circuit translating therein an amplified error voltage signal, an indicator means, an electric motor operable to drive said indicator means and to effect operation of said opposing voltage producing circuit so as to reduce said error voltage signal to zero, said electric motor having a power winding and a control winding, a first circuit means connecting said amplifier output circuit and said control winding, said first circuit means serving to translate said amplified error voltage to said motor and operate said motor to drive said indicator and said opposing voltage circuit, a second circuit means connecting a second source of power to said power winding, and means operable selectively for causing stoppage of said motor, said means including a switch connected in said second circuit means for disconnecting said second source of power from said power winding, thereby keeping said amplified error voltage at all times present in said control winding of the first circuit means which is maintained energized by the first power source.

References Cited in the file of this patent

UNITED STATES PATENTS

| | | |
|---|---|---|
| 1,174,337 | Messiter | Mar. 7, 1916 |
| 2,004,724 | Herzog | June 11, 1935 |
| 2,207,829 | Sell | July 16, 1940 |
| 2,228,870 | Darnell | Jan. 14, 1941 |
| 2,298,216 | Lamberger | Oct. 6, 1942 |
| 2,329,841 | Keinath | Sept. 21, 1943 |
| 2,360,751 | Ziebolz | Oct. 17, 1944 |
| 2,598,812 | Marco | June 3, 1952 |
| 2,610,052 | Macgeorge | Sept. 9, 1952 |
| 2,630,007 | Howe | Mar. 3, 1953 |
| 2,649,715 | Goble | Aug. 25, 1953 |
| 2,680,012 | Bozoian | June 1, 1954 |